INVENTORS
L.D. KLEISS
E.S. PALMER
BY
Hudson & Young
ATTORNEYS

INVENTORS
L.D. KLEISS
E.S. PALMER
BY
Hudson & Young
ATTORNEYS 3,206,394
NATURAL GASOLINE RECOVERY PROCESS
CONTROL METHOD
Louis D. Kleiss and Everett S. Palmer, Borger, Tex., assignors to Phillips Petroleum Company, a corporation of Delaware
Filed May 1, 1961, Ser. No. 106,907
14 Claims. (Cl. 208—341)

This invention relates to an improved method of and apparatus for controlling a natural gasoline recovery process. In one specific aspect, this invention relates to an improved method of and apparatus for controlling a natural gasoline recovery process wherein primary control resides in controlling the composition of the residue gas.

A conventional natural gasoline recovery process employs an absorption step wherein a lean oil absorbs the natural gasoline from a raw gas feed. Natural gasoline is recovered from the rich oil by a distillation step, for example, and the stripped lean oil recycled to the absortion step. The recovered natural gasoline is then stabilized. Control of the conventional natural gasoline recovery process resides primarily in controlling the composition of the rich oil stream from the absorber and the composition of the natural gasoline recovered from the stabilizing step.

We have discovered an improved method of an apparatus for controlling a natural gasoline recovery process wherein the control of said natural gasoline recovery process resides primarily in controlling the composition of a combined residue gas.

Accordingly, an object of this invention is to provide an improved method of an apparatus for controlling a natural gasoline recovery process.

Another object of this invention is to provide an improved method of and apparatus for controlling a natural gasoline recovery process wherein primary control resides in controlling the composition of the residue gas.

Another object of this invention is to provide an improved method of and apparatus for controlling a natural gasoline recovery process whereby a residue gas having a desired heating value is obtained.

Another object of this invention is to provide an improved method of and apparatus for controlling the blending of residual gaseous streams.

Other objects, advantages and features of our invention will be readily apparent to those skilled in the art from the following description and appended claims.

The inventive method of controlling a natural gasoline recovery process is based upon predicting the composition of a combined residual gaseous product from the absorption and stabilizing steps. As a result of this prediction, the rate of flow of enriching residue gas from the stabilizing step is adjusted. By employing the inventive predictive control method, the effect of process dead time is substantially eliminated. Dead time in a process can be defined as the time lapse between the initiation of a change in the process and the detection of the effect of the change on the process.

The effect of process dead time is readily apparent when, for example, it is assumed that it is desired to produce a residue gas having a constant heating value. If operating conditions are such that the temperature of the lean oil feed is suddenly lowered, and a conventional feed-back control method is employed, a period of time passes before the effect of this change is noted in the residue gas product stream. Adjusting the flow of lean oil to the absorption step in response to this noted change will not return the heating value of the residue gas to the desired value until the dead time of the process has elapsed. By predicting a change in the heating value of the residue gas responsive to the change in lean oil temperature, the effect of process dead time can be minimized.

The inventive control method of producing a residue gas of a desired composition will hereinafter be discussed specifically as applied to the control of a natural gasoline recovery process so as to produce a residue gas of controlled heating value.

We have discovered that the heating value of a residual gaseous product from the absorption step of a natural gasoline recovery process is a function of the gas-to-oil ratio and also of the temperature of the rich oil at the completion of the absorption step. We have further discovered that when this absorber residue gas is combined with an enrichment gas from the gasoline stabilization step to produce a residual gaseous blend of substantially constant heating value that the heating value of this blend can be accurately predicted by an equation of the general form:

$$\text{B.t.u./c.f. of blend} = a + b\left(\frac{\text{absorber gas rate}}{\text{absorber oil rate}}\right) +$$
$$c(\text{rich oil temperature}) +$$
$$d\left(\frac{\text{gas rate from stabilizer}}{\text{flow rate of gas blend}}\right) \text{(Equation 1)}$$

where $a$, $b$, $c$, and $d$ are constants.

In a conventional natural gasoline recovery plant, absorber oil is circulated at a fixed rate. Equation 1 thus becomes:

$$\text{B.t.u./c.f. of blend} = a + b'(\text{absorber gas rate}) + c(\text{rich oil temperature} +$$
$$d\left(\frac{\text{gas rate from stabilizer}}{\text{flow rate of gas blend}}\right) \text{(Equation 2)}$$

Also, in a conventional natural gasoline recovery plant the flow of residue gas from the absorber is in a reasonably constant ratio to the total flow rate of the residual gas blend. This reduces the number of measurements involved and changes Equation 2 to:

$$\text{B.t.u./c.f. of blend} = a + b''(\text{flow rate of gas blend}) +$$
$$c(\text{rich oil temperature}) +$$
$$d\left(\frac{\text{gas rate from stabilizer}}{\text{flow rate of gas blend}}\right) \text{(Equation 3)}$$

The value of the constants in Equation 3 can be determined for a particular process by recording a number of steady state observations (including B.t.u. determinations of the blended residual gas) at various operating conditions, then inserting these observations in Equation 3 and solving as simultaneous algebraic equations. A method of determining these constants is discussed on page C–29 of Petroleum Engineer, January, 1960 issue, published by the Petroleum Engineer Publishing Company. For example, in a conventional natural gasoline recovery plant having 10–20 tray absorbers in parallel, a 30 tray natural gasoline stabilizer, a lean oil (kerosene) feed rate of 1,665 g.p.m., and a raw natural gas feed having a heating value of 1,022 B.t.u.'s per cubic foot, it was determined that Equation 3 became:
in a spinning electrode character cylinder is used in con- $$\text{B.t.u./c.f. of blend} = 934.8 + 1.75 \text{ (mm. c.f.h. blended gas)} + 0.16 \text{ (°F. rich oil)} +$$
$$460\left(\frac{\text{c.f.h. gas from stabilizer}}{\text{c.f.h. blended gas}}\right)$$

where $a = 934.8$, $b'' = 1.75$, $c = 0.16$ and $d = 460$.

The foregoing discoveries can be utilized in a predictive control system to control the B.t.u. content of a blended residue gas at a specified value. Measurement signals representing the process variables cited in Equation 3 are passed to a computer. The computer output signal is used to manipulate the flow of gas from the stabilization step so as to hold constant the heating value of the blended residue gas. The control system is predictive as it predicts and compensates for process upsets before a heating value change is noted in the residue gas blend.

Figure 1:
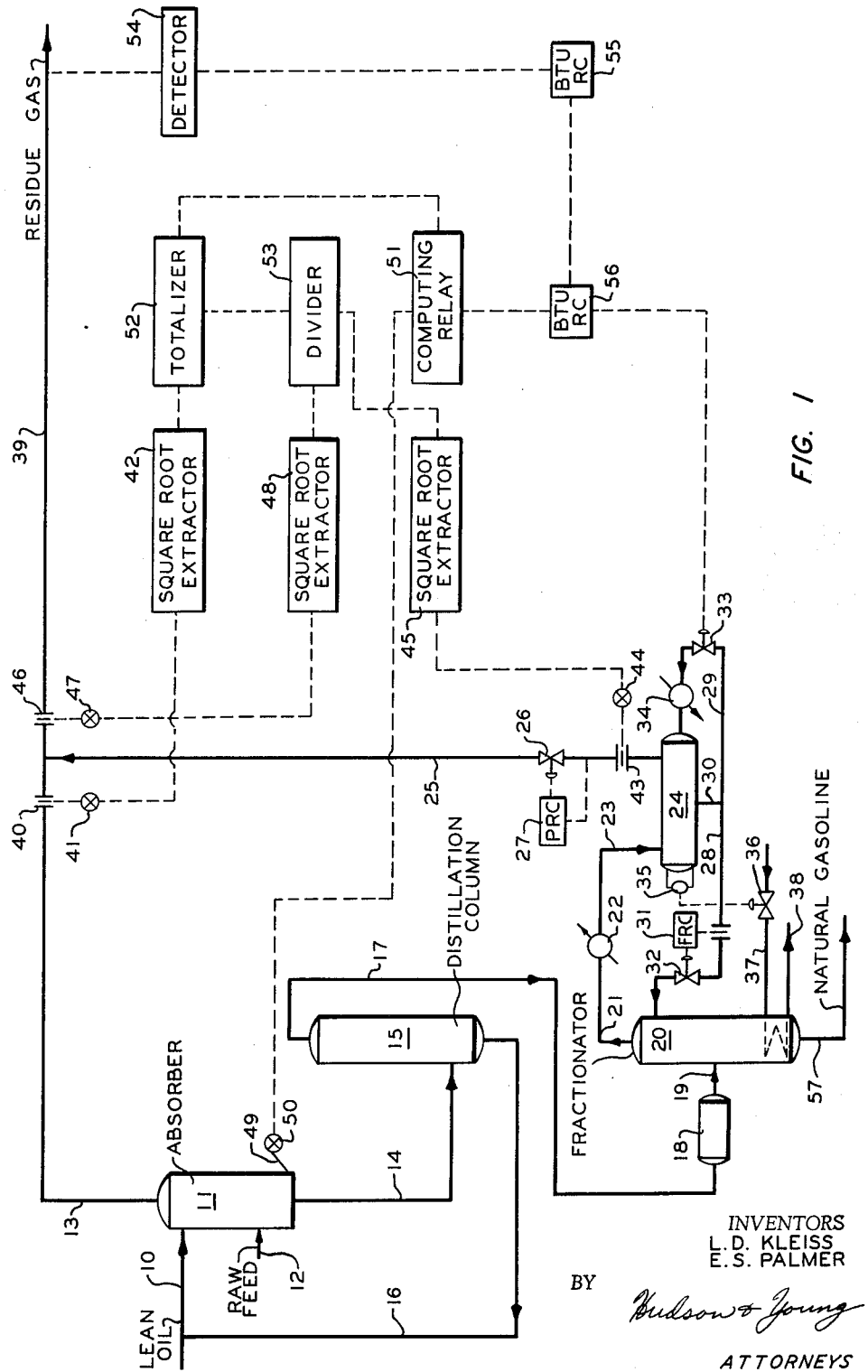
FIGURE 1 is a schematic diagram of one embodiment of the inventive control method.

Referring to FIGURE 1, lean oil is passed to an absorber 11 by means of a conduit 10. A raw natural gas feed is passed to absorber 11 by means of a conduit 12. A residue gaseous stream is removed from absorber 11 by means of a conduit 13. A rich oil stream is removed from absorber 11 via conduit 14 and passed to a distillation column 15.

A lean oil stream is removed from the bottom of distillation column 15 and recycled to conduit 10 via conduit 16. A stripped natural gasoline product stream is removed from the top of distillation column 15 and passed to a surge vessel 18 via conduit 17. It is within the scope of this invention to provide other means of separating the absorption oil from the natural gasoline and to eliminate the surge vessel.

A natural gasoline feed stream is passed from surge vessel 18 to a fractionator 20 via conduit 19. Within said fractionator 20, the natural gasoline feed is deethanized or otherwise stabilized and a natural gasoline product removed from fractionator 20 via conduit 57. An overhead vaporous stream is removed from the top of fractionator 20 via conduit 21 and passed to a heat exchange means 22. The vaporous stream is partially condensed within heat exchange means 22 and passed to an accumulator 24 via conduit 23.

Condensed liquid is withdrawn from accumulator 24 and recycled via conduit 30, conduit 28 and valve 32 to the top of fractionator 20. The rate of flow through valve 32 is controlled by a means such as a flow-recorder controller 31. A constant pressure is maintained in accumulator 24 by a means such as pressure recorder-controller 27 which actuates valve 26 and permits vapor to pass into conduit 25. Vapor is evolved from accumulator 24 by heating the liquid contained therein as required. Liquid is circulated from accumulator 24 through conduit 30, conduit 29, valve 33, and heater 34. The positioning of valve 33 determines the rate of vaporization. This method of controlling vapor rate is preferred over an adjustable by-pass around heat exchanger 22 as it has a more rapid response, causes a minimum of pressure disturbance in fractionator 20, and minimizes the formation of hydrates which would result from stagnation in heat exchanger 22. The enrichment residue gas in conduit 25 is combined with the residue gas from absorber 11 flowing through conduit 13, the place of communication between conduits 13 and 25 referred to as the contact zone.

A heating medium is passed to a heat exchange means in the lower region of fractionator 20 via conduit 37 and removed from said heat exchange means via conduit 38. The flow of said heating medium to conduit 37 is controlled by a liquid level sensing means 35 determining the liquid level in accumulator 24 and opening or closing valve 36 in response thereto. It is within the scope of this invention to employ other conventional methods of controlling the stabilizing step in fractionator 20.

Referring again to FIGURE 1, the method of effectively predicting the heating value of the combined residual gaseous stream in conduit 39 will be described. Conduit 13 is provided with a rate of flow sensing means such as an orifice 40 across which a pressure differential is developed. This differential pressure is transmitted by a differential pressure transmitter 41 to a square root extractor 42 or the like which can be any commercially available instrument that provides a signal that is linear and directly proportional to a rate of flow, such as, for example, a Sorteberg force bridge of the type described in U.S. Patent 2,643,055.

Conduit 25 is provided with a rate of flow sensing means such as an orifice 43 across which a pressure differential is developed. This differential pressure is transmitted by differential pressure transmitter 44 to a square root extractor 45 or the like. The temperature of the rich oil in absorber 11 is measured by a temperature sensing means 49 and a signal representative of said measurement is transmitted via transmitter 50 to a computing relay 51. If, for example, the temperature sensing means employed is a thermocouple, and computing relay 51 is a pneumatic instrument, transmitter 50 can be any commercially available instrument which will transpose an electrical input signal into a pneumatic output signal, such as a Brown Electronik Air-O-Line Controller, described in Brown Instrument Catalog 1531.

Square root extractors 42, 45 and 48 are instruments capable of extracting the square root of an input variable and multiplying the result obtained by a constant. The constant inserted into square root extractor 42 is representative of the orifice coefficient multiplied by the constant $b'$ in Equation 2. A constant is inserted into square root extractor 45 which is representative of the orifice coefficient multiplied by the constant $d$ in Equation 2. A constant is inserted into square root extractor 48 which is representative of the orifice coefficient.

Divider 53 is an instrument, such as the Sorteberg force bridge, which is capable of dividing one input variable by another input variable. Divider 53 divides the output of square root extractor 45 by the output of square root extractor 48 to generate the term, $d$ (gas rate from stabilizer)/(flow rate of gas blend).

Totalizer 52 is an instrument, such as a Moore M/F adding relay illustrated in Bulletin 631 distributed by Moore Products Co., Philadelphia, Pennsylvania, which is capable of adding two input variables, and, in addition thereto, adding to or subtracting from the total sum a bias. Totalizer 52 adds signals from square root extractor 42 and divider 53, and transmits an output signal representing, $b'$ (absorber gas rate)+$d$ (gas rate from stabilizer)/(flow rate of gas blend)+bias.

Computing relay 51 is an instrument, such as the Foxboro M 56-4 computing relay which is described in Foxboro Technical Information 37–A–57a published by the Foxboro Company, Foxboro, Massachusetts. Computing relay 51 is capable of solving an equation of the form:

$$\text{Output} = g(A) + B + \text{bias}$$

where A and B are input signals and $g$ is the adjustable gain of the computing relay. Gain $g$ of this relay represents the constant $c$ in Equation 2. The output from temperature transmitter 50 is fed to input A. The output of totalizer 52 is used as input B. When the sum of the bias of totalizer 52 and the bias of computing relay 51 is set equal to constant $a$ of Equation 2, the output of computing relay 51 constitutes a solution of Equation 2, and is the predicted heating value of blended gas flowing in conduit 39. This signal is transmitted to a predictive B.t.u.-recorder-controller 56, which in turn opens or closes valve 33 in response to said predicted heating value (B.t.u. content) so as to provide a combined residual gaseous stream having a desired heating value.

Analyzing means 54, such as a Cutler-Hammer calorimeter described in Cutler-Hammer Bulletin 99001, is employed to determine the heating value of the combined residual gaseous stream in conduit 39. Analyzing means 54 transmits a signal to a B.t.u.-recorder-controller 55. The output of recorder-controller 55 makes small adjustments in the set point of predictive B.t.u. recorder-controller 56. These set point adjustments compensate for unpredicted variables such as slow changes in the molecular weight of absorber oil. The set point changes are relatively slow, and do not require any great speed in the response of detector 54.

The inventive control system as illustrated in FIGURE 1 is capable of producing a combined residual gaseous stream in conduit 39 having a heating value equal to or above the heating value of the residue gas passing through conduit 13, with the upper heating value limit determined by the heating value of the enriching stream flowing through conduit 25.

It is within the scope of this invention to consider other variables, such as the pressure in absorber 11, in order to predict the heating value of the combined residual gaseous stream. In a like manner, the effect on the heating value of the residue gas flowing from absorber 11 by a change in absorber pressure can be determined, and for any change in absorber pressure, a corresponding change in the predicted B.t.u. content can be computed.

Figure 2:
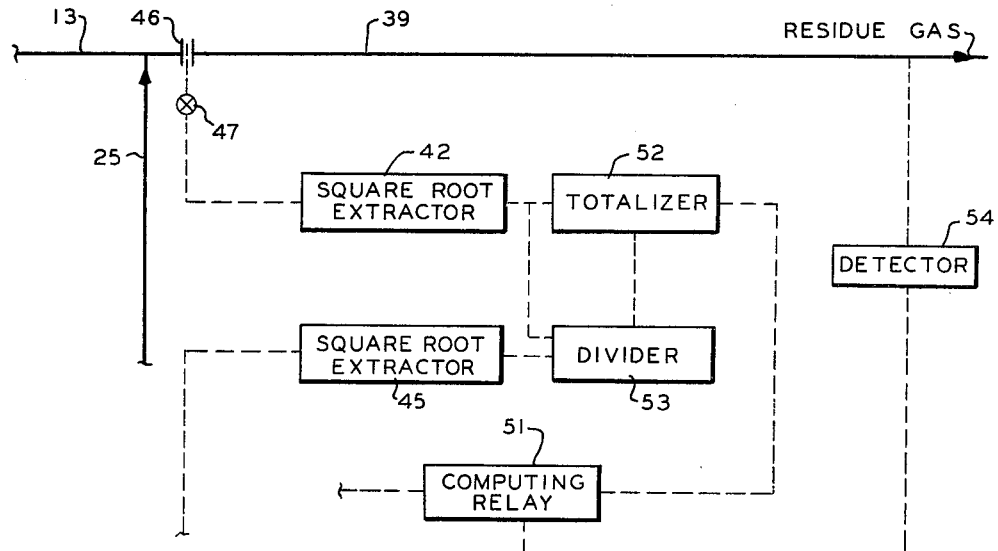
FIGURE 2 is a schematic diagram of another embodiment of the inventive control method.

If it is assumed that the flow of enrichment gas in conduit 25 will be relatively small or in constant ratio when compared to the flow of residue gas in conduit 13, the inventive control method illustrated in FIGURE 2 can be utilized. In this modification, the predictive portion of the control system operates to solve Equation 3. Only that portion of the control system of FIGURE 1 changed is illustrated. The same numbers are employed in FIGURES 1 and 2 to illustrate those portions of the apparatus performing like functions. It is noted that only three measurements are now involved in computing a predicted heating value of the combined residual gaseous stream in conduit 39. The rate of flow as determined by orifice 46 is now transmitted to square root extractor 42. Square root extractor 42 transmits a signal to both totalizer 52 and divider 53. The adjustable multiplying constant inserted in square root extractor 42 is set to represent $b''$, referring to Equation 3. The adjustable multiplying constant inserted in square root extractor 45 is set to represent $(b'')(d)$, again referring to Equation 3. The output of divider 53 is:

$$\frac{(b'')(d)(\text{gas rate from stabilizer})}{(b'')(\text{flow rate of gas blend})} = d\left(\frac{\text{gas rate from stabilizer}}{\text{flow rate of gas blend}}\right)$$

The remainder of the apparatus in FIGURE 2 functions as previously described in the discussion of FIGURE 1.

Figure 3:
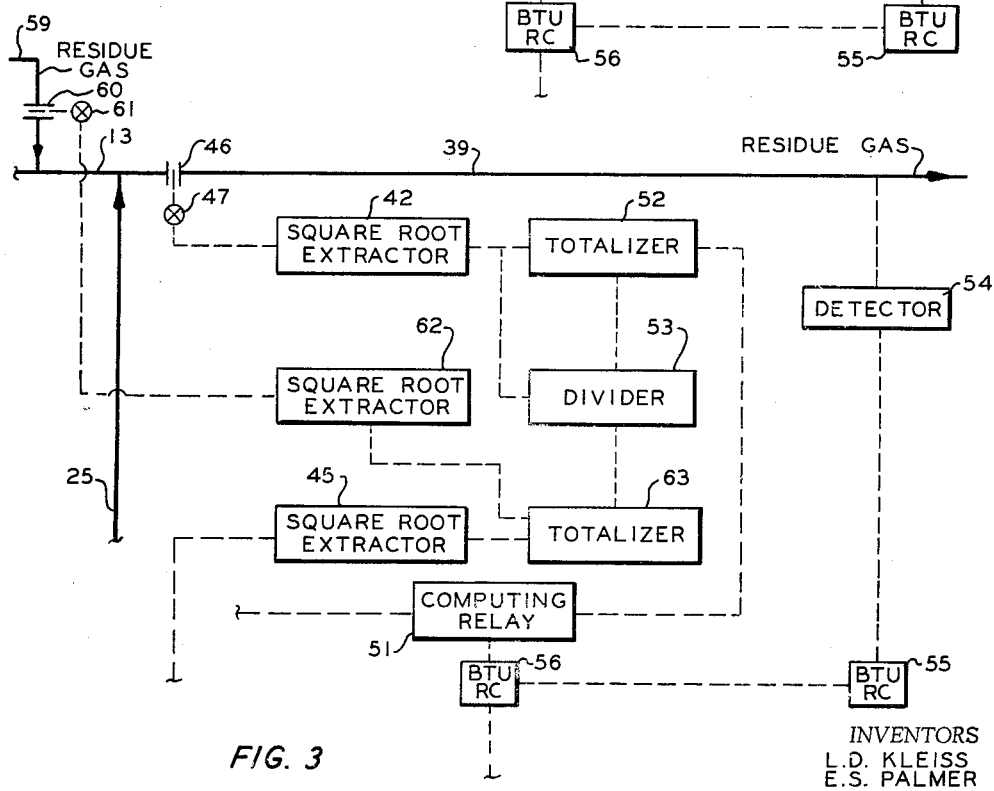
FIGURE 3 is a schematic diagram of yet another embodiment of the inventive control method.

FIGURE 3 illustrates the inventive control method employed to blend three residual gaseous streams to produce a combined residual gaseous stream of a desired composition or heating value. Again, only that portion of the control system of FIGURE 1 changed is illustrated. The same numbers are utilized in FIGURE 3 to designate apparatus having the same functions as in FIGURES 1 and 2. The inventive control method of FIGURE 3 is based upon assuming that the flow of residue gas through conduits 25 and 59 is relatively small as compared with the flow of residue gas through conduit 13. If this assumption were not correct, it is obvious that the control system of FIGURE 3 could be readily modified by reason of the control system of FIGURE 1. It can readily be seen that FIGURE 3 also demonstrates the method of using an additional variable to predict the composition or heating value of a combined residual gaseous stream in conduit 39.

Assuming that it is desired to obtain a combined residual gaseous stream having a constant heating value, the rate of flow through conduit 59 is measured and the effect upon the heating value is added to the effect obtained from the flow of the enriching stream. For example, let it be assumed that the heating value of the residue stream passing through conduit 59 is above the desired heating value of the combined residual gaseous stream. Conduit 59 is provided with an orifice 60 across which a pressure differential is developed. The differential pressure is transmitted by differential pressure transmitter 61, such as a Foxboro $d/p$ cell, to a square root extractor 62 or the like, which can be any commercially available instrument that provides a signal that is linear and directly proportional to a rate of flow. Within square root extractor 62, the square root of an input signal is obtained and the result multiplied by a constant, said constant representative of the difference in heating value between the residue gas stream flowing through conduit 59 and the desired heating value of the combined residual gaseous stream in conduit 39. The output of square root extractor 62 transmitted to totalizer 63 is thus representative of an enriching heating value passing to the combined residual gaseous stream in conduit 39. Totalizer 63 is an instrument capable of summing two input variables, such as a Moore adding relay. Totalizer 63 sums the enriching heating values obtained from square root extractor 62 and square root extractor 45 and transmits an output signal representative of the total to divider 53. The remaining apparatus of FIGURE 3 functions in the same manner as described in the discussion of FIGURES 1 and 2.

The inventive control systems illustrated in FIGURES 1, 2 and 3 provide an efficient method of controlling a natural gasoline recovery process by predicting the residue gas composition resulting from a change in rich oil temperature, gas throughput, or enrichment flow. As previously noted, this prediction is necessary because of time lags in the absorber, distillation column, fractionator, and fluid transportation means. An early prediction enables the control system to add enrichment vapor at the proper time and in the proper amount to maintain a residual gaseous stream of constant composition.

The control systems as outlined in FIGURES 1, 2 and 3 have a built-in rate action. For example, when a computation of the predicted composition of the combined residual gaseous stream calls for enrichment, the incremental enrichment is passed from the fractionator accumulator. When it is desired, for example, to increase the heating value of the combined residual gaseous stream, the enrichment flow will be temporarily high in heating value as light material was largely flashed off at the previous enrichment rate. This abnormally rich vapor which was caused by a sudden increase in enrichment demand will return to a normal heating value when the incremental increase in absorption at the absorbers works through the distillation column, surge vessel and the fractionator. The reverse will occur when a computation calls for a cutback in enrichment.

As will be evident to those skilled in the art, various modifications of this invention can be made, or followed, in the light of the foregoing disclosure and discussion without departing from the spirit or scope thereof.

We claim:

1. In a natural gasoline recovery process which comprises contacting a natural gas feed with an absorption oil in an obsorption zone, withdrawing from said absorption zone a first residue gas, withdrawing from said absorption zone a rich oil, passing said rich oil to a separation zone, withdrawing natural gasoline from said separation zone, withdrawing absorption oil from said separation zone, passing said natural gasoline to a stabilization zone, withdrawing from said stabilization zone a stabilized natural gasoline product, and withdrawing from said stabilization zone a second residue gas; a method of control which comprises combining said first residue gas and said second residue gas in a contact zone, measuring a property of said rich oil which is representative of the temperature of said rich oil, measuring a property of said first residue gas which is representative of the rate of flow of said first residue gas, measuring a property of said second residue gas which is representative of the rate of flow of said second residue gas, combining all of said measurements to produce a value representative of the impending composition of said combined residue gas, adjusting the flow of said second residue gas to said contact zone in response to said value, measuring a property of said combined residue gas which is representative of the composition thereof, and further adjusting the flow of said second residue gas to said contact zone in response to said measured property of said combined residue gas.

2. In a natural gasoline recovery process which comprises contacting a natural gas feed with an absorption oil in an absorption zone, withdrawing from said absorption zone a first residue gas, withdrawing from said absorption zone a rich oil, passing said rich oil to a separation zone, withdrawing natural gasoline from said separation zone, withdrawing absorption oil from said separation zone, passing said natural gasoline to a stabilization zone, withdrawing from said stabilization zone a stabilized natural gasoline, and withdrawing from said stabilization zone a second residue gas; a method of control which comprises combining said first residue gas and said second residue gas in a contact zone, measuring the temperature of said rich oil, transmitting a first signal representative of said temperature measurement to a computing zone, measuring the rate of flow of said second residue gas to said contact zone, transmitting a second signal representative of said rate of flow measurement of said second residue gas to said computing zone, measuring the rate of flow of said first residue gas to said contact zone, transmitting a third signal representative of said measurement of said first residue gas rate of flow to said computing zone, withdrawing from said contact zone a combined residue gas, measuring the rate of flow of said withdrawn combined residue gas, transmitting a fourth signal representative of said rate of flow measurement of said combined residue gas to said computing zone, combining said first, second, third and fourth signals in said computing zone to produce a fifth signal representative of the impending composition of said withdrawn combined residue gas, transmitting said fifth signal from said computing zone to a means of controlling the rate of flow of said second residue gas to said contact zone, thereby adjusting the rate of flow of said second residue gas in response thereto, measuring a property of said withdrawn combined residue gas which is representative of the composition thereof, and further adjusting the rate of flow of said second residue gas to said contact zone in response to said measured composition of said combined residue gas.

3. In a natural gasoline recovery process which comprises contacting a natural gas feed with an absorption oil in an absorption zone, withdrawing from said absorption zone a first residue gas, withdrawing from said absorption zone a rich oil, passing said rich oil to a separation zone, withdrawing natural gasoline from said separation zone, withdrawing absorption oil from said separation zone, passing said natural gasoline to a stabilization zone, withdrawing from said stabilization zone a stabilized natural gasoline product, and withdrawing from said stabilization zone a second residue gas; a method of control which comprises combining said first residue gas and said second residue gas in a contact zone, withdrawing from said contact zone a combined residue gas, measuring the temperature of said rich oil, transmitting a first signal representative of said temperature measurement to a computing zone, measuring the rate of flow of said second residue gas to said contact zone, transmitting a second signal representative of said rate of flow measurement of said second residue gas to said computing zone, measuring the rate of flow of said combined residue gas from said contact zone, transmitting a third signal representative of said rate of flow measurement of said combined residue gas to said computing zone, combining said first, second and third signals in said computing zone to produce a fourth signal representative of the impending composition of said combined residue gas, transmitting said fourth signal from said computing zone to a means of adjusting the rate of flow of said second residue gas to said contact zone, thereby controlling the rate of flow of said second residue gas in response to an impending composition of said combined residue gas, measuring a property of said combined withdrawn residue gas which is representative of the composition thereof, and further adjusting the rate of flow of said second residue gas to said contact zone in response to said measured composition of said combined residue gas.

4. In a residue gas blending process which comprises contacting a natural gas feed with an absorption oil in an absorption zone, withdrawing from said absorption zone a first residue gas, withdrawing from said absorption zone a rich oil, passing said rich oil to a separation zone, withdrawing natural gasoline from said separation zone, withdrawing absorption oil from said separation zone, passing said natural gasoline to a stabilization zone, withdrawing from said stabilization zone a stabilized natural gasoline product, withdrawing from said stabilization zone a second residue gas, passing said first, second and a third residue streams to contact zone, and withdrawing from said contact zone a combined residue gas; a method of control which comprises measuring the temperature of said rich oil, transmitting a first signal representative of said temperature measurement to a computing zone, measuring the rate of flow of said second residue gas to said contact zone, transmitting a second signal representative of said rate of flow measurement of said second residue gas to said computing zone, measuring the rate of flow of said third residue gas to said contact zone, transmitting a third signal representative of said rate of flow measurement of said third residue gas to said computing zone, measuring the rate of flow of said combined gas withdrawn from said contact zone, transmitting a fourth signal representative of said rate of flow measurement of said combined residue gas to said computing zone, combining said first, second and third signals in said computing zone to produce a fifth signal representative of the impending composition of said combined residue gas, transmitting said fifth signal from said computing zone to a means of adjusting the rate of flow of said second residue gas to said contact zone, thereby controlling the rate of flow of said second residue gas in response to said impending composition of said combined residue gas, measuring a property of said withdrawn combined residue gas which is representative of the composition thereof, and further adjusting the rate of flow of said second residue gas to said contact zone in response to said measured composition of said combined residue gas.

5. Apparatus comprising, in combination, an absorption vessel, first conduit inlet means communicating with the upper region of said absorption vessel, second conduit inlet means communicating with the lower region of said absorption vessel, third conduit outlet means communicating with the top of said absorption vessel, a separation vessel, fourth conduit outlet means communicating between the bottom of said absorption vessel and said separation vessel, fifth conduit outlet means communicating with the bottom of said separation vessel, a stabilizing vessel, sixth conduit outlet means communicating between the top of said separation vessel and said stabilizing vessel, seventh conduit outlet means communicating with the bottom of said stabilizing vessel, a condensing means, an eighth conduit outlet means communicating between the top of said stabilizing vessel and said condensing means, a storage vessel, a ninth conduit outlet means communicating between said condensing means and said storage vessel, tenth conduit outlet means communicating between said storage vessel and said third conduit outlet means, a computing means, means of measuring the liquid temperature in the bottom of said absorption vessel, means of transmitting a signal representative of said temperature measurement to said computing means, means of measuring the rate of flow through said tenth conduit outlet means, means of transmitting a signal representative of said rate of flow measurement through said tenth conduit outlet means to said computing means, means of measuring the rate of flow through said third conduit outlet means upstream of the position where said tenth conduit outlet means communicates with said third conduit outlet means, means of transmitting a signal representative of said rate of flow measurement through said third conduit outlet means to said computing means, means of measuring the rate of flow through said third conduit outlet means downstream of said position where said tenth conduit outlet means communicates with said third conduit outlet means, means of transmitting a signal representative of said rate of flow measurement through said third conduit downstream outlet means to said computing means, means of transmitting a signal from said computing means to a control means of adjusting the rate of flow through said tenth conduit outlet means, means of analyzing the flow through said third conduit outlet means downstream of said position where said tenth conduit outlet means communicates with said third conduit outlet means, and means of further adjusting the rate of flow through said tenth conduit outlet means in response to a signal transmitted from said analyzing means.

6. Apparatus comprising, in combination, an absorption vessel, first conduit inlet means communicating with the upper region of said absorption vessel, second conduit inlet means communicating with the lower region of said absorption vessel, third conduit outlet means communicating with the top of said absorption vessel, a separation vessel, fourth conduit outlet means communicating between the bottom of said absorption vessel and said separation vessel, fifth conduit outlet means communicating with the bottom of said separation vessel, a stabilizing vessel, sixth conduit outlet means communicating between the top of said separation vessel and said stabilizing vessel, seventh conduit outlet means communicating with the bottom of said stabilizing vessel, a condensing means, eighth conduit outlet means communicating between the top of said stabilizing vessel and said condensing means, a storage vessel, ninth conduit outlet means communicating between said condensing means and said storage vessel, tenth conduit outlet means communicating between said storage vessel and said third conduit outlet means, a computing means, means of measuring the liquid temperature in the bottom of said absorption vessel, means of transmitting a signal representative of said temperature measurement to said computing means, means of measuring the rate of flow through said tenth conduit outlet means, means of transmitting a signal representative of said rate of flow measurement through said tenth conduit outlet means to said computing means, means of measuring the rate of flow through said third conduit outlet means downstream of the position where said tenth conduit outlet means communicates with said third conduit outlet means, means of transmitting a signal representative of said rate of flow measurement through said third conduit outlet means to said computing means, means of transmitting a signal from said computing means to a control means of adjusting the rate of flow through said tenth conduit outlet means, means of analyzing the flow through said third conduit outlet means downstream of said position where said tenth conduit outlet means communicates with said third conduit outlet means, and means of further adjusting the rate of flow through said tenth conduit outlet means in response to a signal transmitted from said analyzing means.

7. Apparatus comprising, in combination, an absorption vessel, first conduit inlet means communicating with the upper region of said absorption vessel, second conduit inlet means communicating with the lower region of said absorption vessel, third conduit outlet means communicating with the top of said absorption vessel, a separation vessel, fourth conduit outlet means communicating between the bottom of said absorption vessel and said separation vessel, fifth conduit outlet means communicating with the bottom of said separation vessel, a stabilizing vessel, sixth conduit outlet means communicating between the top of said separation vessel and said stabilizing vessel, seventh conduit outlet means communicating with the bottom of said stabilizing vessel, a condensing means, eighth conduit outlet means communicating between the top of said stabilizing vessel and said condensing means, a storage vessel, ninth conduit outlet means communicating between said condensing means and said storage vessel, tenth conduit outlet means communicating between said storage vessel and said third conduit outlet means, eleventh conduit means communicating with said third conduit outlet means, a computing means, means of measuring the liquid temperature in the bottom of said absorption vessel, means of transmitting a signal representative of said temperature measurement to said computing means, means of measuring the rate of flow through said tenth conduit outlet means, means of transmitting a signal representatitve of said rate of flow measurement through said tenth conduit means to said computing means, means of measuring the rate of flow through said eleventh conduit means, means of transmitting a signal representative of said rate of flow measurement through said eleventh conduit means to said computing means, means of measuring the rate of flow through said third conduit outlet means downstream of the positions where said tenth and eleventh conduit means communicate with said third conduit outlet means, means of transmitting a signal representative of said rate of flow measurement through said third conduit outlet means to said computing means, means of transmitting a signal from said computing means to a control means of adjusting the rate of flow through said tenth conduit outlet means, means of analyzing the flow through said third conduit outlet means downstream of the positions where said tenth conduit outlet means and said eleventh conduit outlet means communicate with said third conduit outlet means, and a means of further adjusting the flow through said tenth conduit outlet means in response to a signal transmitted from said analyzing means.

8. In a natural gasoline recovery process which comprises contacting a natural gas feed with an absorption oil in an absorption zone, withdrawing from said absorption zone a first residue gas, withdrawing from said absorption zone a rich oil, passing said rich oil to a separation zone, withdrawing natural gasoline from said separation zone, withdrawing absorption oil from said separation zone, passing said natural gasoline to a stabilization zone, withdrawing from said stabilization zone a stabilized natural gasoline, and withdrawing from said stabilization zone a second residue gas; a method of control which comprises combining said first residue gas and said second residue gas in a contact zone, measuring the temperature of said rich oil, transmitting a signal representative of said temperature measurement to a computing zone, measuring the rate of flow of said second residue gas to said contact zone, transmitting a signal representative of said rate of flow measurement of said second residue gas to said computing zone, measuring the rate of flow of said first residue gas to said contact zone, transmitting a signal representative of said measurement of said first residue gas rate of flow to said computing zone, withdrawing from said contact zone a combined residue gas, measuring the rate of flow of said withdrawn combined residue gas, transmitting a signal representative of said rate of flow measurement of said combined residue gas to said computing zone, transmitting a signal from said computing zone representative of the impending heating valve of said withdrawn combined residue gas to a means of controlling the rate of flow of said second residue gas to said contact zone, thereby adjusting the rate of flow of said second residue gas in response thereto, measuring a property of said withdrawn combined residue gas which is representative of the heating value thereof, and further adjusting the rate of flow of said second residue gas to said contact zone in response to said measured heating value of said combined residue gas.

9. In a natural gasoline recovery process which comprises contacting a natural gas feed with an absorption oil in an absorption zone, withdrawing from said absorption zone a first residue gas, withdrawing from said absorption zone a rich oil, passing said rich oil to a separation zone, withdrawing natural gasoline from said separation zone, withdrawing absorption oil from said separation zone, passing said natural gasoline to a stabilization zone, withdrawing from said stabilization zone a stabilized natural gasoline product, and withdrawing from said stabilization zone a second residue gas; a method of control which comprises combining said first residue gas and said second residue gas in a contact zone, withdrawing from said contact zone a combined residue gas, measuring the temperature of said rich oil, transmitting a signal representative of said temperature measurement to a computing zone, measuring the rate of flow of said second residue gas to said contact zone, transmitting a signal representative of said rate of flow measurement of said second residue gas to a compting zone, measuring the rate of flow of said combined residue gas from said contact zone, transmitting a signal representative of said rate of flow measurement of said combined residue gas to a computing zone, transmitting a signal from said computing zone representative of an impending heating value of said combined residue gas to a means of adjusting the rate of flow of said second residue gas to said contact zone, thereby controlling the rate of flow of said second residue gas in response to said impending heating value of said combined residue gas, measuring a property of said combined withdrawn residue gas which is representative of the heating value thereof, and further adjusting the rate of flow of said second residue gas to said contact zone in response to said measured heating value of said combined residue gas.

10. In a residue gas blending process which comprises contacting a natural gas feed with an absorption oil in an absorption zone, withdrawing from said absorption zone a first residue gas, withdrawing from said absorption zone a rich oil, passing said rich oil to a separation zone, withdrawing natural gasoline from said separation zone, withdrawing absorption oil from said separation zone, passing said natural gasoline to a stabilization zone, withdrawing from said stabilization zone a stabilized natural gasoline product, withdrawing from said stabilization zone a second residue gas, passing said first, second and a third residue streams to a contact zone, and withdrawing from said contact zone a combined residue gas; a method of control which comprises measuring the temperature of said rich oil, transmitting a signal representative of said temperature measurement to a computing zone, measuring the rate of flow of said second residue gas to said contact zone, transmitting a signal representative of said rate of flow measurement of said second residue gas to a said computing zone, measuring the rate of flow of said third residue gas to said contact zone, transmitting a signal representative of said rate of flow measurement of said third residue gas to said computing zone, measuring the rate of flow of said combined gas withdrawn from said contact zone, transmitting a signal representative of said rate of flow measurement of said combined residue gas to said computing zone, transmitting a signal representative of an impending heating value of said combined residue gas from said computing zone to a means of adjusting the rate of flow of said second residue gas to said contact zone, thereby controlling the rate of flow of said second residue gas in response to said impending heating value of said combined residue gas, measuring a property of said withdrawn combined residue gas which is representative of the heating value thereof, and further adjusting the rate of flow of said second residue gas to said contact zone in response to said measured heating value of said combined residue gas.

11. The method of control of claim 8 wherein said combining comprises combining said first, second, third and fourth signals to solve the following equation:

$$\text{Output} = a + b(\text{first residue gas flow rate}) + c(\text{rich oil temperature}) + d\left(\frac{\text{second residue gas flow rate}}{\text{combined residue gas flow rate}}\right)$$

wherein $a$, $b$, $c$ and $d$ are constants and Output is representative of said impending heating value.

12. The process of claim 9 wherein said combining comprises combining said first, second and third signals so as to solve the following equation:

$$\text{Output} = a + b(\text{combined residue gas flow rate}) + c(\text{rich oil temperature}) + d\left(\frac{\text{second residue gas flow rate}}{\text{combined residue gas flow rate}}\right)$$

wherein $a$, $b$, $c$ and $d$ are constants and Output is representative of said impending heating value.

13. The apparatus of claim 5 wherein said computing means solves the following equation:

$$\text{Output} = a + b(\text{flow rate through third conduit means upstream of tenth conduit means communicating with said third conduit means}) + c(\text{temperature in bottom of absorption vessel}) + d\left(\frac{\text{flow rate through tenth conduit means}}{\text{flow rate through third conduit means downstream of communication with tenth conduit means}}\right)$$

wherein $a$, $b$, $c$ and $d$ are constants.

14. The apparatus of claim 6 wherein said computing means solves the following equation:

$$\text{Output} = a + b(\text{flow rate through third conduit means downstream of communication with tenth conduit means}) + c(\text{temperature in bottom of absorption vessel}) + d\left(\frac{\text{flow rate through tenth conduit means}}{\text{flow rate through third conduit means downstream of communication with tenth conduit means}}\right)$$

wherein $a$, $b$, $c$ and $d$ are constants.

References Cited by the Examiner

UNITED STATES PATENTS

| | | | |
|---|---|---|---|
| 2,547,970 | 4/51 | Phillips et al. | 208—341 |
| 2,564,791 | 8/51 | Ribble | 208—341 |
| 2,600,133 | 6/52 | Simms | 208—341 X |
| 2,771,149 | 11/56 | Miller et al. | 183—2 |
| 2,976,234 | 3/61 | Webber | 208—350 |

ALPHONSO D. SULLIVAN, *Primary Examiner.*

OTHER REFERENCES

MILTON STERMAN, *Examiner.*

"Automatic Control," vol. 7–8, May 1958, pages 43 to 48.

Pink, Petroleum Refiner, vol. 38, No. 3, March 1959, pp. 215 to 220.